US012810888B2

(12) United States Patent
Carlson et al.

(10) Patent No.: US 12,810,888 B2
(45) Date of Patent: Nov. 24, 2026

(54) SYSTEM AND METHOD FOR TRAINING MACHINE LEARNING SYSTEMS THAT SEPARATE RADIO SIGNALS WHICH OVERLAP IN FREQUENCY AND TIME

(71) Applicant: General Dynamics Mission Systems, Inc., Fairfax, VA (US)

(72) Inventors: Lindsey Skyler Carlson, Bothell, WA (US); Jennifer Y Liu, Chandler, AZ (US); Gerardo Leal, Austin, TX (US); Keith Palermo, Gilbert, AZ (US)

(73) Assignee: GENERAL DYNAMICS MISSION SYSTEMS, INC., Fairfax, VA (US)

( * ) Notice: Subject to any disclaimer, the term of this patent is extended or adjusted under 35 U.S.C. 154(b) by 329 days.

(21) Appl. No.: 18/439,904

(22) Filed: Feb. 13, 2024

(65) Prior Publication Data

US 2025/0259642 A1 Aug. 14, 2025

(51) Int. Cl.
*G10L 21/0324* (2013.01)
*G10L 19/012* (2013.01)
*G10L 25/30* (2013.01)

(52) U.S. Cl.
CPC ........ *G10L 21/0324* (2013.01); *G10L 19/012* (2013.01); *G10L 25/30* (2013.01)

(58) Field of Classification Search
CPC ... G10L 21/0324; G10L 19/012; G10L 25/30; G10L 21/0272
See application file for complete search history.

(56) References Cited

U.S. PATENT DOCUMENTS

| | | | | |
|---|---|---|---|---|
| 8,190,425 | B2 * | 5/2012 | Mehrotra | H04S 3/008 704/203 |
| 11,121,896 | B1 * | 9/2021 | Bendlin | H04L 27/22 |
| 2014/0142958 | A1 * | 5/2014 | Sharma | G10L 19/018 704/500 |
| 2019/0034108 | A1 * | 1/2019 | Chang | H04L 67/1097 |
| 2020/0136877 | A1 * | 4/2020 | Kim | H04L 27/2649 |
| 2021/0014630 | A1 * | 1/2021 | Leppänen | G06F 3/165 |

(Continued)

OTHER PUBLICATIONS

Woods, K. J. P. et al., "Schema learning for the cocktail party problem," Proceedings of the National Academy of Sciences, 2018, pp. E3313-E3322, vol. 115, No. 14.

(Continued)

*Primary Examiner* — Michael N Opsasnick
(74) *Attorney, Agent, or Firm* — Ingrassia Fisher & Lorenz, LLP

(57) ABSTRACT

The neural network is trained to separate plural radio signals that substantially overlap in in frequency and time. A pair of processing pipelines receive the source audio signals and represent them in the complex I-Q plane to define first and second baseband representations. To these baseband representations are applied first and second rotating vectors, of rotational rate corresponding to first and second tuning offsets to define first and second training data which are then mixed to generate overlapping data training data, which are fed to the neural network to produce first and second estimated source signals. The neural network is trained from the overlapping data by maximizing a scale-invariant ratio comparing the first and second estimated source signals with the first and second source audio signals.

20 Claims, 2 Drawing Sheets

(56) References Cited

U.S. PATENT DOCUMENTS

| | | | | |
|---|---|---|---|---|
| 2021/0133614 | A1* | 5/2021 | Ashrafi | G02F 3/00 |
| 2022/0051677 | A1* | 2/2022 | Park | H04L 12/2807 |
| 2022/0291328 | A1* | 9/2022 | Ozturk | G01S 5/0226 |
| 2022/0406311 | A1* | 12/2022 | Fang | H04M 1/2475 |
| 2023/0098678 | A1* | 3/2023 | Zhang | G10L 21/0208<br>704/231 |
| 2025/0046316 | A1* | 2/2025 | Rose | H04M 3/568 |
| 2025/0259642 | A1* | 8/2025 | Carlson | G10L 19/012 |

OTHER PUBLICATIONS

Garofolo, J.S. et al., "CSR-I (WSJ0) Complete," Linguistic Data Consortium, 1993, Philadelphia.

Cosentino, J. et al., "LibriMix: An Open-Source Dataset for Generalizable Speech Separation," arXiv Electrical Engineering and Systems Science, May 20, 2020.

Wisdom, S. et al., "What's All the Fuss About Free Universal Sound Separation Data?," arXiv, Computer Science Nov. 2, 2020.

Yu, D. et al., "Permutation invariant training of deep models for speaker-independent multi-talker speech separation," IEEE International Conference on Acoustics, Speech and Signal Processing (ICASSP), Jan. 3, 2017.

Wisdom, S. et al., "Unsupervised Sound Separation Using Mixture Invariant Training," arXiv, Electrical Engineering and Systems Science Oct. 24, 2020.

Denton, T. et al., "Improving Bird Classification with Unsupervised Sound Separation," arXiv Electrical Engineering and Systems Science Oct. 7, 2021.

Défossez, A., "Hybrid Spectrogram and Waveform Source Separation," arXiv, Electrical Engineering and Systems Science Aug. 30, 2022.

Stoller, D. et al., "Wave-U-Net: A Multi-Scale Neural Network for End-to-End Audio Source Separation," arXiv, Computer Science Jun. 8, 2018.

Nachmani, E. et al., "Voice Separation with an Unknown No. of Multiple Speakers," arXiv, Electrical Engineering and Systems Science Sep. 1, 2020.

Panayotov, V et al., "Librispeech: An ASR corpus based on public domain audio books," IEEE International Conference on Acoustics, Speech and Signal Processing (ICASSP), 2015, pp. 5206-5210, South Brisbane, QLD, Australia.

Roux, J. et al.,"SDR—half-baked or well done?," arXiv, Computer Science (Mitsubishi Electric Research Laboratories (MERL)) Nov. 6, 2018.

* cited by examiner

SYSTEM AND METHOD FOR TRAINING MACHINE LEARNING SYSTEMS THAT SEPARATE RADIO SIGNALS WHICH OVERLAP IN FREQUENCY AND TIME

TECHNICAL FIELD

The disclosure relates generally to the problem of differentiating among plural concurrent radio transmissions using machine learning systems. More particularly the disclosure relates to a technique for generating training data for such machine learning systems and to radio receivers employing the machine learning systems so trained.

BACKGROUND

This section provides background information related to the present disclosure which is not necessarily prior art.

A yet-unsolved problem in the radio frequency (RF) domain is with transmission collisions. The problem exists, for example, in air traffic control radio systems. Currently air traffic control radios use amplitude modulation (AM), although transmission collisions occur in systems using other communication modes.

In high-traffic AM environments like aviation, radio operators often unknowingly transmit at the same time, leading to other radios receiving both transmissions layered together. This renders both transmissions difficult—if not impossible—to understand, leading to frustration at best and, at worst, critical transmissions being completely lost.

In other contexts, some have used machine learning (ML) techniques to separate speakers in the audio domain. In the audio domain speaker separation context, machine learning (neural network) models are trained with a large corpus of speech training data, which requires ample instances of overlapping speech. Once trained, the models are used, for example, to separate two speakers speaking at once. The audio input source data for the two overlapping speakers are submitted to the neural network, which assigns likelihood scores to the estimated separated utterances as having come from speaker A vs speaker B. Although the models were not necessarily trained on the speech of speakers A and B, the neural network is nevertheless able to differentiate between the two, based on having been trained on speech from a large number of different speakers.

How well the neural network is able to discriminate among different speakers can be given a figure of merit using a technique known as scale-invariant source-to-noise ratio (SI-SNR), also sometimes known as the scale-invariant signal-to-distortion ratio (SI-SDR). The technique calculates the ratio of energy of each original source over the noise (or distortion) present in the estimated separated sources when compared to the original source.

While the conventional audio domain speaker separation technique could be applied in high-traffic aviation applications, there remains much room for improvement, particularly given the critical nature of the air traffic control application.

SUMMARY

The disclosed system performs the speaker separation problem in the radio frequency (RF) domain. It takes into account variabilities that exist between speaker A and speaker B (e.g., received at the control tower) because their voices have been modulated for transmission at radio frequencies by radio transceivers, which due to their own idiosyncrasies, have introduced variability. In order to train a machine learning system to recognize this radio frequency domain variability, special ML training techniques are required. The present disclosure will focus on these training techniques.

In a nutshell, the disclosed system employs an automated training data generation source which forms part of the data pipeline for training and using radio frequency domain speaker separation models that are implemented in a neural network. Audio source data for plural speakers are fed through plural data pipelines, each applying radio frequency domain artifacts to the audio source data.

Although the present disclosure will focus on introducing RF domain variability in the transmitter tuning discrepancy, the disclosed automated training data generation source also illustrates how other RF domain variabilities can be introduced.

The disclosed automated training data generation source works at the baseband frequency. Thus the disclosed training data generation source adds RF domain variability to the audio source data as if it were modulated by a transmitter, propagated through a propagation medium to a receiver, and then demodulated by the receiver. In applications where the propagation medium is free space (i.e. the radio signals are broadcast over the airwaves), the automated training data generation source can selectively add Gaussian noise to simulate random interfering noise from the free space environment.

The disclosed automated training data generation source is also designed to inject variability (e.g., noise) into the audio source data for regularization, to prevent overfitting of the neural network models.

According to one aspect of the disclosed method, a neural network is trained to separate plural radio signals that substantially overlap in in frequency and time. A pair of signal processing pipelines are receptive respectively of first and second source audio signals. Each of the first and second source audio signals are represented in the complex I-Q plane to define first and second baseband representations. These first and second baseband representations are multiplied, respectively, by first and second rotating vectors of rotational rate corresponding to first and second tuning offsets to define first and second training data.

The first and second training data are mixed to generate overlapping data training data that are fed to the neural network to produce first and second estimated source signals. The neural network is then trained using the overlapping data by maximizing a scale-invariant ratio comparing the first and second estimated source signals with the first and second source audio signals.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figure 1:
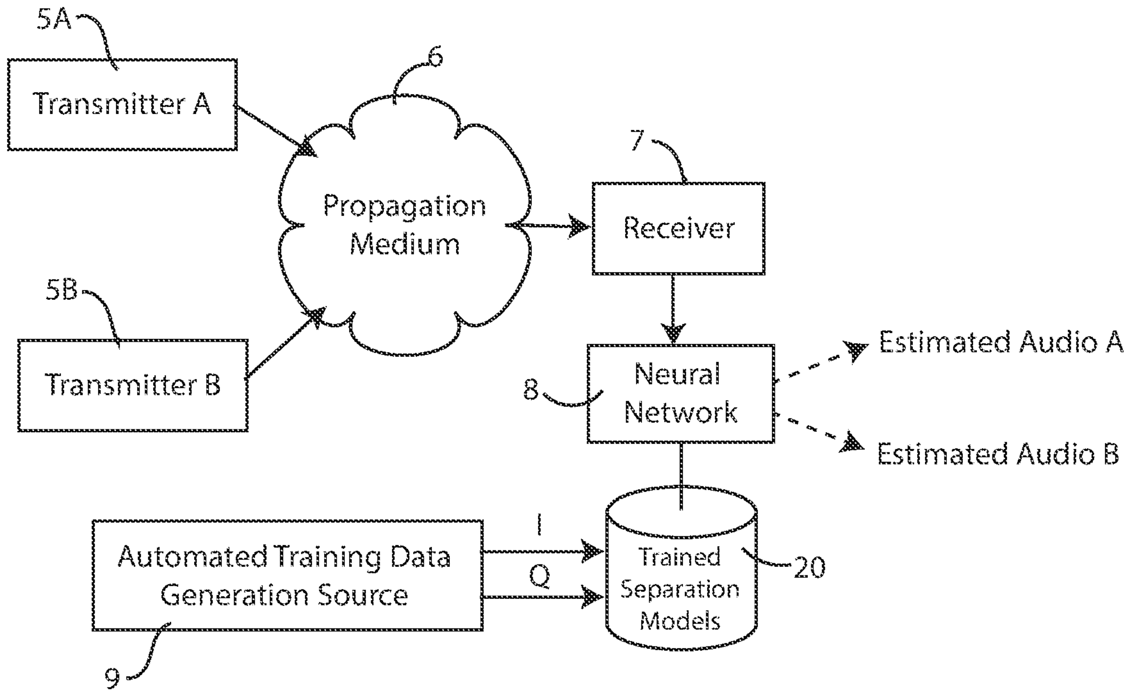
FIG. 1 illustrates an exemplary trained neural network use case of a radio communication system which for performing speaker separation based on RF domain analysis.

The disclosed speaker differentiation system relies on a neural network that has been trained using radio frequency (RF) domain training data to enhance speaker separation. An exemplary use case of the system is shown in FIG. 1. Transmitters 5A and 5B communicate through a propagation medium 6, such as free space. For this example it will be assumed that Transmitters 5A and 5B are transmitting concurrently, so that their respective transmissions are layered together when received by receiver 7. Thus the received signals are largely an unintelligible blend of both speakers talking at once.

Instead of producing an audible output of the unintelligible blend, the output of receiver 7 is fed to neural network 8, which has been trained to employ separation models, shown diagrammatically at 20, which have been trained by the automated training data generation source 9. The manner of training these separation models 20 is discussed in greater detail below.

The neural network, based on its training, regresses (separates) the unintelligible blend of audio from receiver 7 into two estimated audio streams, designated estimated audio A and estimated audio B. Having been separated by the neural network, these two estimated streams may now be presented to the receiver operator as separate channels. Thus the receiver operator can listen to each channel separately and thereby make sense of both transmissions from transmitters 5A and 5B.

Figure 2:
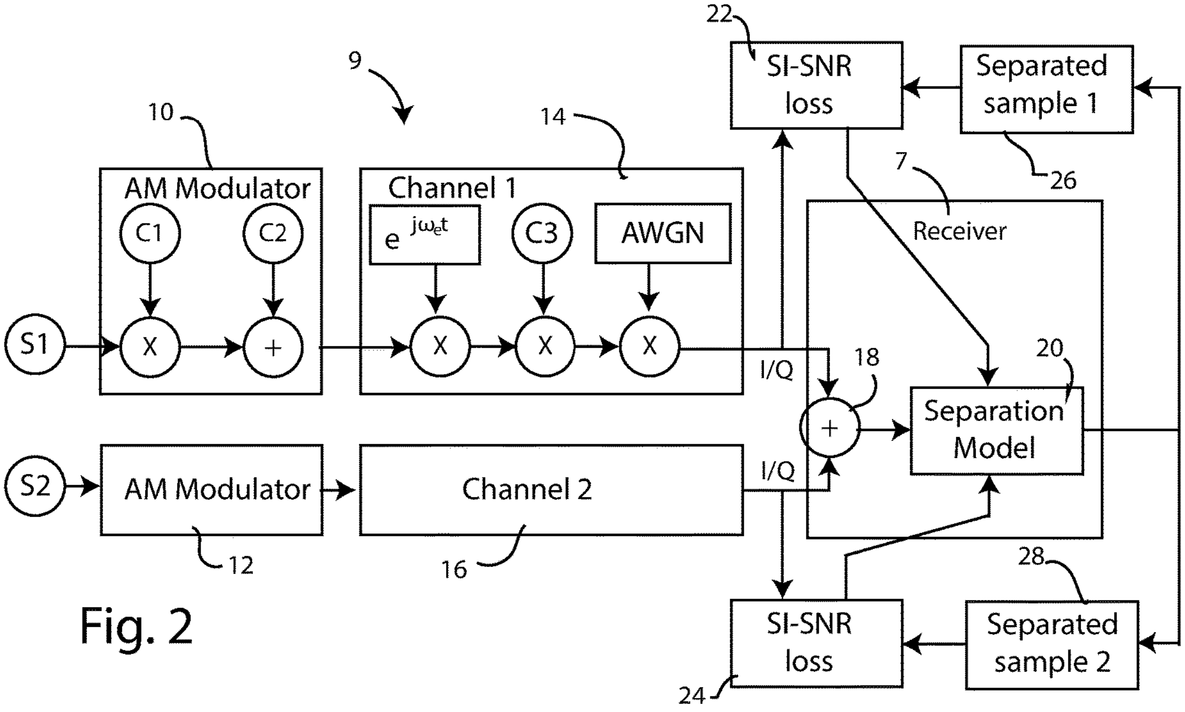
FIG. 2 is a block diagram of the automated training data generation source.

The automated training data generation source 9 is shown in greater detail in FIG. 2. From a system standpoint, the purpose of the automated training data generation source 9 is to generate training data used to configure the neural network 8 (FIG. 1) so that it can classify or separate different received transmissions which happen to be partially or fully overlapping. Once the training data are created, further use of the automated training data generation source 9 is optional. It may be subsequently used to retrain the models periodically or on an ad hoc basis, if desired. However, once trained, the neural network 8 is capable of performing the above described classification (separation) of incoming transmissions without live interaction with the automated training data generation source 9.

The disclosed automated training data generation source 9 is designed to inject radio frequency (RF) domain variability into a preexisting corpus of independent (i.e., non-overlapping) audio samples and add them together to create an RF signal collision. For audio-only separation problems (i.e., without RF domain variability), one suitable preexisting corpus is the LibriMix data set. Information on this data set may be found in J. Consentino, et. al., "LibriMix: An Open-Source Dataset for Generalizable Speech Separation," arXiv, 2020. This dataset comprises a corpus of prerecorded plural-speaker mixtures (e.g. two-speaker and/or three speaker mixtures) combined with ambient noise samples.

As will be seen, the disclosed automated training data generation source supports injection of several different types of RF domain variability, including frequency offset, bias, signal-to-noise ratio (SNR), amplitude and modulation index. To illustrate the concept, the present disclosure will concentrate on injection of RF domain variability via adjustment of the frequency offset (tuning error). Thus for illustration purposes these other listed variability sources have been set to null (switched off).

In FIG. 2, two input audio sources S1 and S2 are illustrated. These audio sources may be obtained from the LibriMix data set or other suitable source of speech data. These audio sources S1 and S2 (and the LibriMix data set from which they come) are data in the audio domain. In other words they are time-varying audio signals carrying human speech. The objective of the automated training data generation source 9 is to inject RF domain variation into these audio domain signals.

In the disclosed embodiment, RF domain variation is injected by simulating the effect of RF amplitude modulation (AM modulation). While other modulation modes could be used, the disclosed embodiment will illustrate how the disclosed techniques may be applied to avionic communications between aircraft and the control tower. Currently AM modulation is used for this communication.

In FIG. 2, two parallel processing data pipelines are depicted, corresponding to Channel 1 at 14 and Channel 2 at 16. The details of the Channel 1 pipeline have been described in detail. Channel 2 is implemented in the same fashion and thus has not been described in detail here. These data pipelines may be implemented by suitably programmed signal processor or processors (hereinafter referred to as the signal processing system), using digital signal processors (DSP), field programmable gate array (FPGA) devices, or the like.

Normalization

The audio source signals S1 and S2 are fed to the first processing block designated the AM modulator block 10. These input signals are first processed by applying a normalizing constant C1. Normalization is applied here to ensure that the audio power ranges fall within a maximum magnitude of 1. For each signal S1 and S2, the normalization process finds the maximum amplitude and divides that signal by that maximum. In this way all input audio signal values fall within a range of [−1,1] for each signal. This ensures that the system is controlling for the other parameters, such as path loss attenuation and noise. In other words, the data are normalized for training.

Normalization offers two important benefits. First, the average power of the audio is normalized (over time) so that the AM modulation index is controlled—the relationship of the audio power to the carrier power determines the modulation index. Second, the normalized audio is limited to prevent peaks in the audio signal from exceeding the magnitude of the carrier constant.

Add Carrier Bias

The normalized audio signals are next fed to a processing block where a carrier constant C2 may be added to adjust the AM modulation index. As discussed previously, the disclosed implementation injects RF domain variability as it would appear in the baseband signal—i.e., as the signal appears after it has been modulated onto a carrier by the transmitter, propagated through the propagation medium, and demodulated by the receiver.

Inject Tuning Variability

As described above, the output of the AM modulator block 10 represents a baseband AM signal, carrying the normalized audio and AM carrier based on the audio sources. To simulate tuning offset variability between transmitter and receiver, the normalized signal is multiplied by a tuning error parameter $e^{j\omega_e t}$, where $\omega_e$ is the radian offset frequency, representing the error between the transmit frequency and the receive frequency. Such tuning offset variability between the two channels would give the two channels slightly different audio "fingerprints" allowing them to be differentiated.

Performing the tuning error injection, by multiplication of the complex exponential factor, produces in-phase and quadrature components, referred to as the I and Q components. These components lie in the real-imaginary plane (the complex plane) and effectively represent a time varying phase shift.

Euler's formula expresses the fundamental relationship between the trigonometric functions (e.g., sine, cosine) and the complex exponential function ($e^{jx}$, where j is $\sqrt{-1}$):

$$e^{jx} = \cos(x) + j\sin(x). \quad \text{Eq. 1}$$

This disclosure shall use the complex exponential function, with the understanding that a trigonometric representation can readily be expressed using Euler's formula.

A sinusoid with modulation (such as an AM radio transmission) can be decomposed into, or synthesized from, two amplitude-modulated sinusoids that are in quadrature phase (i.e., with a phase offset of 90 degrees). We can express these quadrature phases, as I for in-phase and Q for quadrature as follows:

$$x(t) = xe^{-j\omega t} = (I + jQ)(\cos(\omega t) - j\sin(\omega t)) \quad \text{Eq. 2}$$

In the above equation, the =(I+jQ) part represents the signal modulation and the (cos(ωt)–j sin(ωt)) corresponds to the radio frequency carrier.

More specifically, we can represent a transmitted signal s(t) in terms of the transmit power level A, and an audio modulation $m_t$ of amplitude less than or equal to 1 as follows. Here transmitter's RF frequency in radians per second is represented by $\omega_1$:

$$s(t) = A(1 + m_t)e^{-j\omega_1 t} \quad \text{Eq. 3}$$

In the above equation, the $e^{-j\omega_1 t}$ term contains the I and Q components, as was illustrated by Eq. 2.

The received signal r(t)—after being mixed to baseband—may be expressed as follows, where $\omega_1$ is the transmitter frequency, $\omega_2$ is the receiver's RF tuning frequency, both in radians per second. In the ideal case, the receiver would be tuned to precisely match the transmitter frequency, but in practice this is often not the case due to oscillator imperfections and doppler shift. Thus in the equations below, we take this tuning error into account by introducing a tuning error term $\omega_e$ in Eq. 6.

$$r(t) = s(t)Be^{j\omega_2 t} + n(t) \quad \text{Eq. 4}$$

$$r(t) = AB(1 + m_t)e^{j\omega_1 t}e^{j\omega_2 t} + n(t) \quad \text{Eq. 5}$$

$$r(t) = AB(1 + m_t)e^{j\omega_e t} + n(t) \quad \text{Eq. 6}$$

In the above equations A is the transmit power level, B is the attenuation of the signal due to path loss, combined with the gain of the RF receiver front end. The term n (t) represents the channel and receiver noise. Assuming this to be white noise, there is no effect of multiplying by $e^{j\omega_2 t}$.

As described above, the AM carrier is expressed in the baseband model by the 1 added to m(t). This is apparent when one considers a quiet mic, i.e., no modulation (m(t)=0). In such case the transmitted signal is simply $Ae^{j\omega_1 t}$, an unmodulated carrier. Therefore the received signal r(t) as in Eq. 6 is a rotating vector in the I-Q plane, with a rotational rate of $\omega_e$.

The formulation above applies to a single transmitter. In the illustrated embodiment where two transmitters are simulated—to model two overlapping transmissions—there would be two rotating vectors in the I-Q plane coming out of the receiver, each with a different rotational rate due to having different $\omega_e$ values. In addition, the magnitude of the vectors will also be different because the path loss to each transmitter is different. These sources of variability are exploited by the disclosed machine learning system.

Path Loss Attenuation Variability (Optional)

After injecting tuning variability, the data pipeline then proceeds to the path loss attenuation variability stage where parameter C3 is optionally applied. Path loss attenuation variability occurs when the simulated RF transmitter on one channel is farther from the receiver than the transmitter on the other channel. Such variability occurs in the real world because RF transmissions propagate through free space as a spherical wavefront. Thus the signal strength falls off as the square of the radial distance from transmitter to receiver. The audible effect is that the more distant signal is not as loud as the nearby signal (assuming all transmitters are operating using the same RF power output and through the same type of antenna. In the present example, the path loss attenuation variability C3 has not been applied, so that the effects of tuning variability alone can be illustrated.

Gaussian Noise Injection (Optional)

Additive white Gaussian noise (AWGN) is injected after the optional path loss attenuation stage. This addition of Gaussian noise simulates the naturally occurring channel noise that is present in any real-world communication system. Gaussian white noise can be selectively added by setting a signal-to-noise parameter, where the injected Gaussian white noise corresponds to the noise floor of the receiver.

Note that the presence of some Gaussian noise is still useful in providing model training regularization, to prevent overfitting of the neural network models. This is so because, being random, the variation in Gaussian noise at each pass through the training data provides suitable regulation.

Neural Network and Its Training

In the disclosed embodiment neural network 8 (FIG. 1) is configured as described in E. Nachmani, et. al, "Voice Separation with an Unknown Number of Multiple Speakers," arXiv 2020, incorporated herein by reference—with one important exception. In Nachmani, a single channel is provided as input of the audio signals to be separated. In the embodiment disclosed here, the neural network architecture is modified to include two separate inputs, one carrying the in-phase signal (I in FIG. 1) and the quadrature signal (Q in FIG. 1).

To train our neural network we maximize each of these I and Q channels separately. Specifically, we maximize the scale-invariant source-to-noise ratio (SI-SNR). Effectively, the neural network weights are established by feeding the I and Q inputs with data from the automated training data generation source 9 and tune the neural network weights by maximizing the SI-SNR equation:

$$SI\text{-}SNR(s, \hat{s}) = 10\log_{10}\frac{\|\tilde{s}_i\|^2}{\|\tilde{e}_i\|^2} \quad \text{Eq. 7}$$

The variables in Eq. 7 are defined as follows:

$$\tilde{s}_i = \frac{\langle s_i, \hat{s}_i\rangle s_i}{|s_i|^2} \quad \text{Eq. 8}$$

$$\tilde{e}_i = \hat{s}_i - \tilde{s}_i, \quad \text{Eq. 9}$$

where $s_i$ is the ground truth source, and $\hat{s}_i$ is the estimated source.

Figure 3:
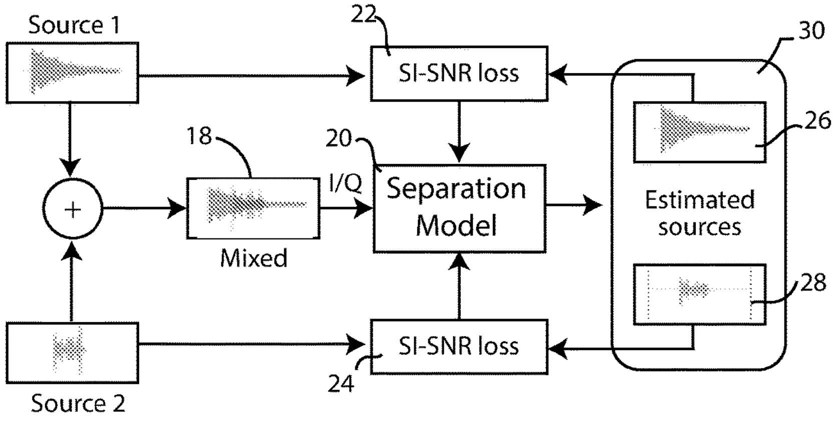
FIG. 3 is a block diagram showing the separation model in greater detail.

FIGS. 2 and 3 both show how the separation model 20 is trained by comparing inputs (after injecting RF domain variability parameters) with the estimated sources—i.e., the separated sample outputs generated by the neural network 7 (FIG. 1) using the separation model 20.

With reference to FIG. 3, the I and Q data corresponding to Source 1 (from channel 1) and Source 2 (from channel 2) are mixed at 18 and those I and Q data are fed as training inputs to the separation model 20. Using the separation model with these I and Q inputs, the neural network 7 (FIG. 1) generates estimated sources, representing its current estimates as to the content of the respective separated samples 26 and 28. These separated samples are fed to the SI-SNR computation blocks 22 and 24, along with the signals from Source 1 and Source 2. Adjustments to the neural network weights, as reflected in the separation model 20 are made based on the results of the SI-SNR computation(s) and the training process is run again.

The training process repeats as above until the SI-SNR training and validation loss tapers off. Note that because each of the channel 1 and channel 2 signals are represented using RF domain I and Q values, the neural network separation model is trained to take the RF domain factors into account. Thus the I and Q phases are each able to have solutions that minimize loss (and thus maximize) SI-SNR.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. Various changes may be made in the function and arrangement of elements described in an exemplary embodiment.

The invention claimed is:

1. A method of training a neural network to separate plural radio signals that substantially overlap in in frequency and time comprising, defining a pair of signal processing pipelines receptive respectively of first and second source audio signals;

representing each of the first and second source audio signals in a complex I-Q plane to define first and second baseband representations;

multiplying the first and second baseband representations respectively by first and second rotating vectors of rotational rate corresponding to first and second tuning offsets to define first and second training data;

mixing the first and second training data to generate overlapping training data that are fed to the neural network to produce first and second estimated source signals; and training the neural network using the overlapping training data by maximizing a scale-invariant ratio comparing the first and second estimated source signals with the first and second source audio signals.

2. The method of claim 1 further comprising training the neural network using a scale-invariant signal to noise ratio.

3. The method of claim 1 further comprising normalizing the first and second source audio signals.

4. The method of claim 1 further comprising normalizing the first and second source audio signals to constrain an audio power to a predefined range.

5. The method of claim 1 further comprising adding an offset value to the first and second source audio signals to represent a carrier constant.

6. The method of claim 1 further comprising injecting a variability factor into the first and second training data to represent path loss attenuation variability.

7. The method of claim 1 further comprising injecting additive white Gaussian noise into the first and second training data to simulate channel noise.

8. The method of claim 1 wherein the first and second source audio signals are obtained from a corpus of prerecorded plural-speaker mixtures combined with ambient noise samples.

9. The method of claim 1 wherein the first and second source audio signals comprise first and second source modulated audio signals.

10. An apparatus for generating training data for a machine learning system that separates plural radio signals that substantially overlap in frequency and time comprising, a pair of signal processing pipelines implemented by a signal processing system and receptive respectively of first and second source audio signals;

the signal processing system being programmed to represent each of the first and second source audio signals in a complex I-Q plane to define first and second baseband representations;

the signal processing system being programmed to multiply the first and second baseband representations respectively by first and second rotating vectors of rotational rate corresponding to first and second tuning offsets to define first and second training data;

the signal processing system being programmed to mix the first and second training data to generate overlapping training data that are fed to the neural network to produce first and second estimated source signals; and the signal processing system defining a separation model and being programmed to generate training data for the machine learning system using the overlapping training data by maximizing a scale-invariant ratio comparing the first and second estimated source signals with the first and second source audio signals.

11. The apparatus of claim 10 further wherein the signal processing system is programmed to maximize a scale-invariant signal to noise ratio.

12. The apparatus of claim 10 wherein the signal processing system is programmed to normalize the first and second source audio signals.

13. The apparatus of claim 10 wherein the signal processing system is programmed to normalize the first and second source audio signals to constrain an audio power to a predefined range.

14. The apparatus of claim 10 wherein the signal processing system is programmed to add an offset value to the first and second source audio signals to represent a carrier constant.

15. The apparatus of claim 10 wherein the signal processing system is programmed to inject a variability factor into the first and second training data to represent path loss attenuation variability.

16. The apparatus of claim 10 wherein the signal processing system is programmed to inject additive white Gaussian noise into the first and second training data to simulate channel noise.

17. The apparatus of claim 10 wherein the first and second source audio signals are obtained from a corpus of prerecorded plural-speaker mixtures combined with ambient noise samples.

18. The apparatus of claim 10 wherein the first and second source audio signals comprise first and second source modulated audio signals.

19. A method of training a neural network to separate plural, overlapping radio signals comprising:

receiving first source audio signals on a first signal processing pipeline and second source audio signals on a second signal processing pipeline, wherein each of the first and second source audio signals represent time-varying audio signals carrying human speech;

processing the first and second source audio signals by applying a normalizing constant to produce first and second normalized source audio signals;

processing the first and second normalized source audio signals by adding a carrier constant to produce first and second carrier-biased source audio signals;

representing each of the first and second carrier-biased source audio signals in a complex I-Q plane to define first and second baseband representations;

multiplying the first and second baseband representations respectively by first and second rotating vectors of rotational rate corresponding to first and second tuning offsets to define first and second training data;

injecting a variability factor into the first and second training data to represent path loss attenuation variability;

injecting additive white Gaussian noise into the first and second training data to simulate channel noise;

mixing the first and second training data to generate overlapping training data that are fed to the neural network to produce first and second estimated source signals; and training the neural network using the overlapping training data by maximizing a scale-invariant ratio comparing the first and second estimated source signals with the first and second source audio signals.

20. The method of claim 19 further comprising training the neural network using a scale-invariant signal to noise ratio.

* * * * *